E. J. C. TIMERMAN.
CHAIN LOCK.
APPLICATION FILED MAR. 13, 1917.

1,239,745.

Patented Sept. 11, 1917.

WITNESSES:

INVENTOR
Eugene J. C. Timerman
BY
Harry D Wallace
ATTORNEY

UNITED STATES PATENT OFFICE.

EUGENE J. C. TIMERMAN, OF SYRACUSE, NEW YORK.

CHAIN-LOCK.

1,239,745.     Specification of Letters Patent.     Patented Sept. 11, 1917.

Application filed March 13, 1917. Serial No. 154,602.

*To all whom it may concern:*

Be it known that I, EUGENE J. C. TIMERMAN, a citizen of the United States, residing at Syracuse, in the county of Onondaga and State of New York, have invented certain new and useful Improvements in Chain-Locks, of which the following is a specification.

This invention relates to improvements in chain locks, and has for its object to provide a novel, simple and effective locking device to be used in connection with the anti-skidding chains employed on the rubber tires of automobiles and like vehicles. A further object is to provide means for preventing the common hook coupling members of the side chains from becoming accidentally disconnected while the vehicle is in motion, which results frequently in the loss of said chains. A further object is to provide a cheap locking device of the class which can be readily and conveniently applied to the chains, and which thereafter may be readily and quickly set in or released from the operative position.

The various features and parts of the invention will be understood from the detailed description which follows, and by reference to the accompanying drawing, in which—

Figure 1:
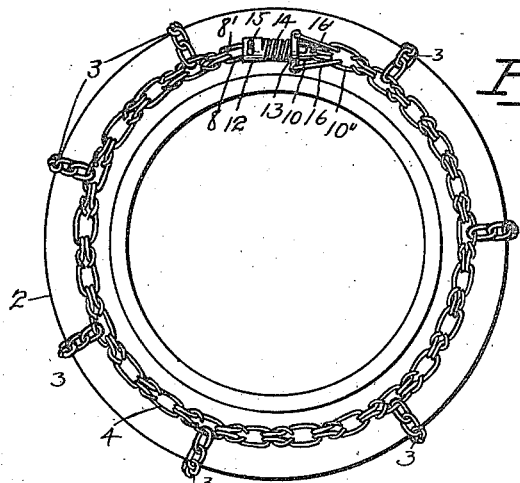
Figure 1 is an elevational view of a vehicle tire, having the well-known anti-skidding chains mounted thereon; showing my locking device operatively applied to the said chains.
Figure 2:
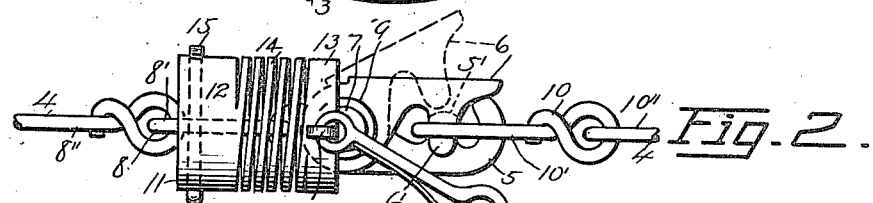
Fig. 2 is an enlarged side view of the locking device and the end portions of the side chain; showing by full and dotted lines the closed and open position of the latch members; also showing the locking device in the released position.
Figure 3:
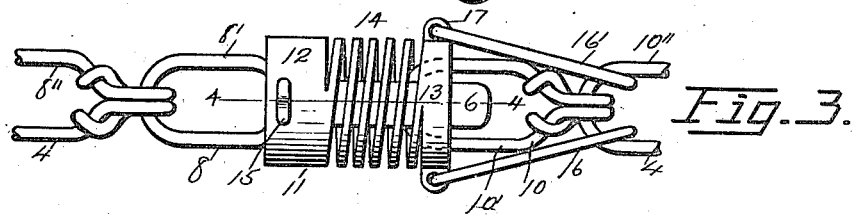
Fig. 3 is a plan view of the same; showing the locking device in the operated position telescoping the latch members.
Figure 4:
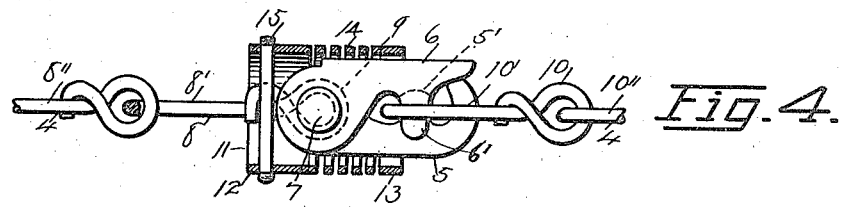
Fig. 4 is a central longitudinal section of the locking device taken on line 4—4 of Fig. 3.

In the drawing, 2 represents generally a pneumatic tire common to motor vehicles. 3 represents the well-known anti-skidding cross chains and 4 represents the usual side chains. In practice, there is one chain 4 on each side of the tire 2, and the cross chains 3 are permanently connected to the side chains. To facilitate applying and removing the parts 3 and 4, the latter are provided with a sort of jack knife latch or coupling comprising members 5 and 6, which are pivoted together at 7. The member 5 corresponding to a knife blade is received within the handle 6. The latch is pivotally connected to an end-link 8 of the chain 4, by means of loops 9, which engage the pivot 7. The members 5 and 6 may be spread apart at their free ends, as shown by dotted lines in Fig. 2, for the insertion of the opposite end-link 10 of the chain 4, which is hooked over a tooth 5' of the member 5. The member 6 is then closed over the blade 5, the former having corresponding teeth 6', which pass through the link 10, as shown by the full lines in Figs. 2 and 4. The latch 5—6 then holds the ends of chains 4 properly coupled unless the jars or vibrations of the wheel or some object, as a stone or chunk of ice, springs or forces said members apart, (as shown by full and dotted lines in Fig. 1). If the latch accidentally opens while the vehicle is in motion, the whole chain structure becomes detached from the wheel and lost. To prevent such loss of the chains, I have devised a novel and effective locking device which will now be described:

11 represents a hollow cylindrical body or sleeve of sufficient diameter to freely slip over the latch 5—6, as well as the link 8. The opposite end portions of said sleeve comprise bands or rings 12 and 13, which are connected by a resilient spiral central portion 14. The ring 12 is perforated diametrically to receive a cotter pin 15, which passes through the ring 12 and also through the large loop portion 8' of the link 8 (as best seen in Fig. 4). By disposing the pin 15 in the loop 8', the sleeve 11 is allowed sufficient longitudinal movement to permit the manipulation of the latch 5—6, as shown in Fig. 2, and also to allow the said sleeve to be shifted to the position shown in Fig. 3, for enveloping the said latch, and thereby preventing the members 5—6 from opening and accidentally releasing the opposite end link 10 from the chain 4. In order to hold the sleeve in the locking position (as in Figs. 1, 3, and 4), I provide a pair of snap hooks 16—16', which are pivoted in lugs 17 carried by the ring 13 of the sleeve. The hooks 16—16' are snapped into the large loop of a link 10'' (see Figs. 1 and 3). In order to effect the engagement of the snap hooks with the loop 10″, it is necessary to stretch the coil spring portion 14 of the sleeve to the extent shown in Fig. 3. By providing the coil 14 a certain amount of resiliency is given to the locking device which not only insures the proper flexing of the chain 4, but the tension of the said coil also prevents the hooks 16—16′ from being accidentally detached, in case the springs 18 of said hooks become impaired or lost. The unsnapping of the hooks 16—16′ allows the coil 14 to contract and the sleeve may then be shifted back to the idle position shown in Fig. 2.

Figure 5:
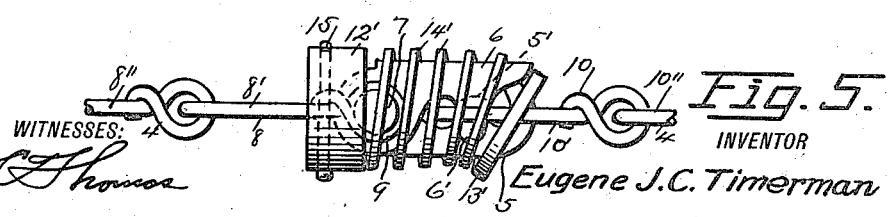
Fig. 5 is a view showing a modified form of the locking device.

In Fig. 5 is illustrated a modified form of the locking device from which the snap hooks are omitted, consisting of the sleeve 11′, rings 12′ and 13′, and an intermediate coil spring portion 14′. The sleeve 11′ is movably secured to the link 8 by a cotter pin 15. To set the sleeve 11′ in the operative or locking position, the operator simply grasps the ring 13′ with his fingers and pulls on said ring until the spring 14′ stretches sufficiently to allow the ring 13′ to be slipped over the point 6″ of the loop member 6, as shown, where the said ring will remain until released by the hand of the operator.

Having thus described my invention, what I claim as new and desire to secure by Letters Patent, is—

1. The combination with the side chain and a latch pivoted to one end link of said chain, of a sleeve movably mounted upon said end link adapted to telescope said latch for preventing opening thereof, and snap hooks carried by said sleeve adapted to engage one of the opposite end links for holding said sleeve in the operative position.

2. The combination with the side chain and a latch coupling pivoted to one end of said chain, the other end of said chain having a link for engaging said latch, of a coil-spring lock encircling the end of the chain adjacent said latch when idle, said spring movable longitudinally for telescoping said latch for preventing the opening thereof, and a pair of snap hooks adapted to stretch and hold said spring in the operative position.

In testimony whereof I affix my signature.

EUGENE J. C. TIMERMAN.

Copies of this patent may be obtained for five cents each, by addressing the "Commissioner of Patents, Washington, D. C."